United States Patent [19]

Iwashita et al.

[11] Patent Number: 4,570,776
[45] Date of Patent: Feb. 18, 1986

[54] DETENT MECHANISM FOR CLUTCHES

[75] Inventors: Takashi Iwashita, Hamakita; Hideo Suzuki, Shizuoka; Ryoji Nakahama, Iwata, all of Japan

[73] Assignee: Sanshin Kogyo Kabushiki Kaisha, Hamamatsu, Japan

[21] Appl. No.: 503,570

[22] Filed: Jun. 13, 1983

[30] Foreign Application Priority Data

Jul. 9, 1982 [JP] Japan ................................ 57-118661

[51] Int. Cl.[4] .............................................. G05G 5/06
[52] U.S. Cl. .................................. 192/114 R; 74/475; 74/527
[58] Field of Search ..................... 192/51, 67 R, 53 G, 192/114 R; 74/475, 527

[56] References Cited

U.S. PATENT DOCUMENTS 2,735,528  2/1956  Dodge ............................... 192/67 R
3,386,546  6/1968  Yourich ............................. 192/51
4,278,156  7/1981  Yano et al. ........................ 192/51

Primary Examiner—Leonard E. Smith
Attorney, Agent, or Firm—Ernest A. Beutler

[57] ABSTRACT

Several embodiments of improved detent devices for elements such as dog clutches. In each embodiment, the detent includes a holding detent for holding the dog clutch in a neutral position and an accelerating detent for accelerating the dog clutch element to its engaged position. In each embodiment, the accelerating detent is effective before the holding detent has been fully released. In some embodiments, the dog clutch element is axially movable and in other embodiments it is rotatable.

32 Claims, 8 Drawing Figures

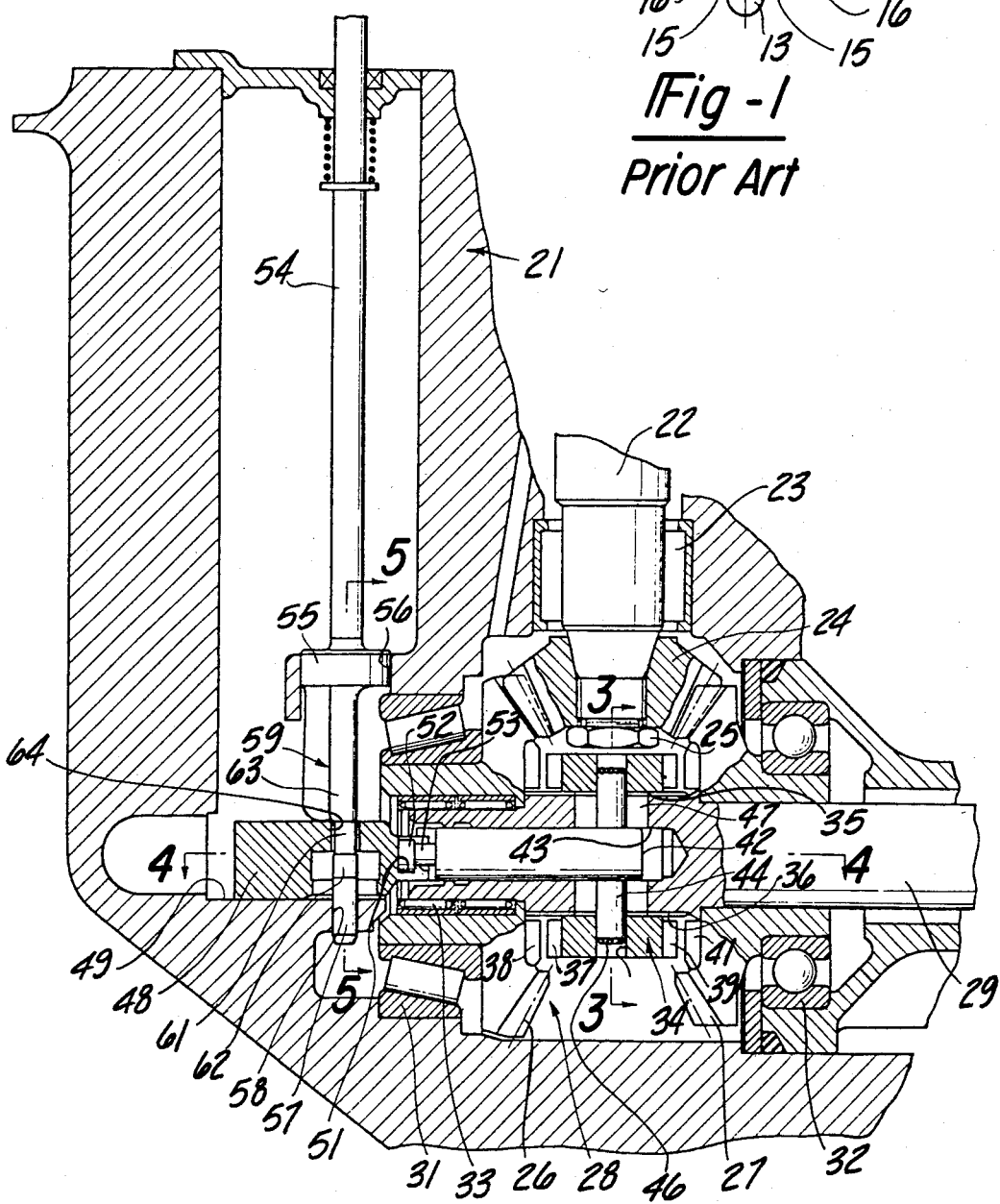
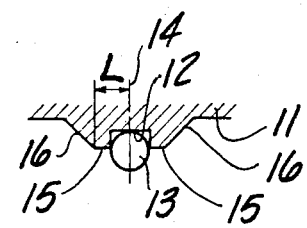
Fig-2
Fig-1
Prior Art

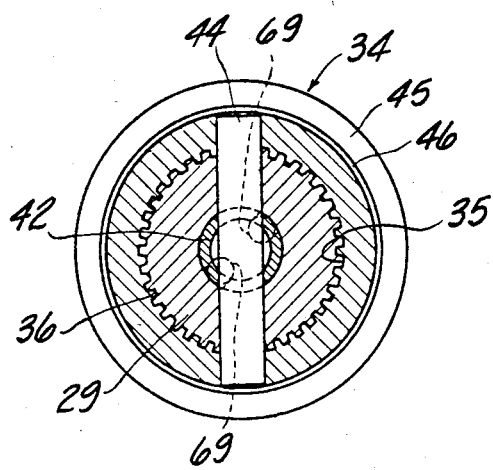
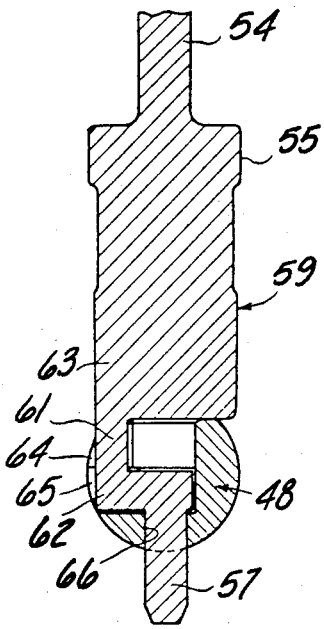
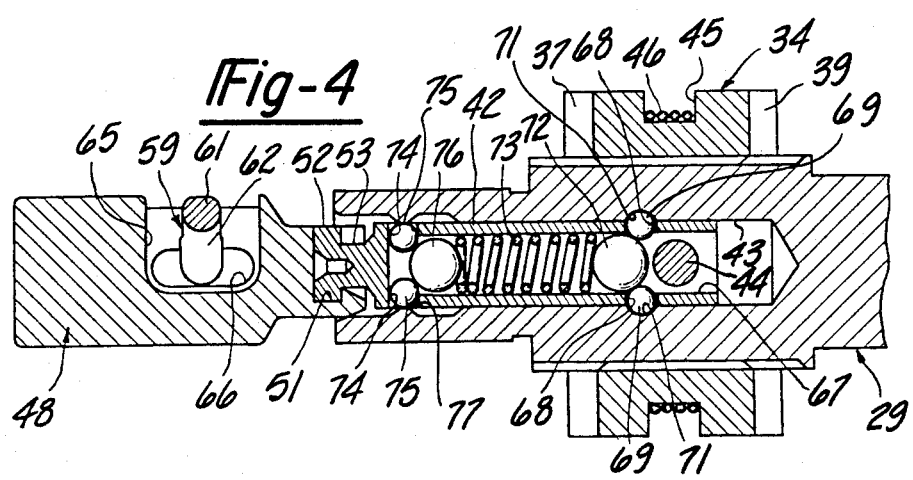

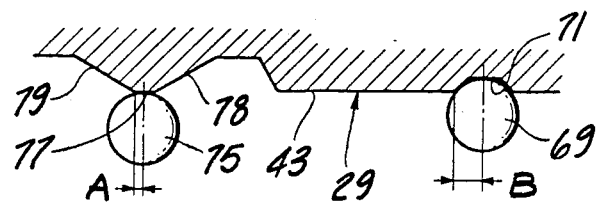
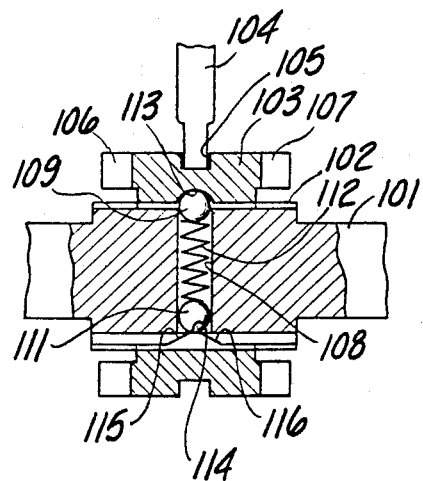
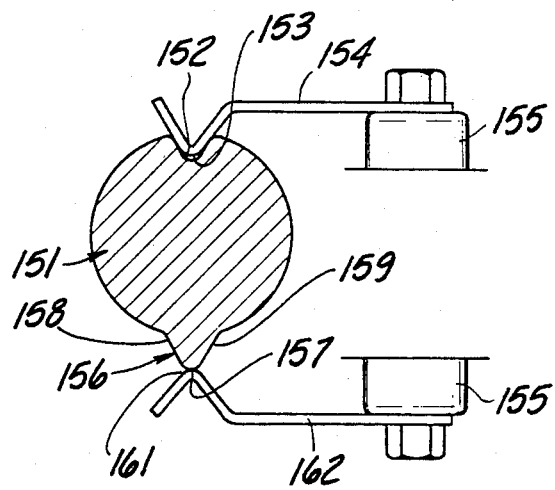

DETENT MECHANISM FOR CLUTCHES

BACKGROUND OF THE INVENTION

This invention relates to a detent mechanism for clutches and more particularly to an improved detent mechanism for the dog clutch of a marine transmission.

Many forms of transmissions, such as the forward/neutral/reverse transmission of a marine drive employ dog clutches for coupling rotating members together. Such dog clutches normally employ a form of detent mechanism that is opertive to engage the clutch element in one of its positions. Normally, the detent mechanism holds the clutch in a released condition. It is desirable, however, to insure quick shifting of the dog clutch jaws into engagement by employing some mechanism for urging the dog clutching element to its engaged position when it has moved from its released position. Frequently, the same detent mechanism is used to exert an axial thrust on the dog clutch element in addition to serving the function of retaining the dog clutch element in its neutral position. Normally, the detent ball operates with a recess for holding the dog clutch element in its released position and with a cam surface for exerting an axial force upon the dog clutch element to move it into engagement.

With prior art type of devices employing a single detent ball for performing both holding and accelerating functions, the clutch element must be moved a substantial distance from its neutral position before the thrust effecting device can be operative. This is a result of the geometric relationships of the arrangement employing a single ball for both purposes. That is, the detent ball must come out of its retaining groove and travel a sufficient distance so as to engage the cam surface before the thrust operation can occur. Of course, such arrangements require fairly substantial travel and, therefore, have many disadvantages.

It is, therefore, a principal object of this invention to provide an improved detent mechanism for a dog clutch.

It is a further object of this invention to provide a dog clutch detent mechanism that will hold the dog clutch element in a neutral condition and which will exert a thrust on the clutch element moving it toward its engaged position as soon as the clutch element has moved only slightly from its neutral position.

In connection with the design of dog clutches and the associated detent mechanisms, it is desirable to provide a very compact arrangement. Frequently, the detent mechanisms must be contained within the clutch element itself and this has required the use of the single detent type of mechanisms as aforedescribed.

It is, therefore, a still further object of this invention to provide an improved and compact detent arrangement for a dog clutch that acts to hold the clutch in a neutral position and which also exerts an actuating thrust on the clutch element once it has moved only slightly from the neutral position.

It is a still further object of the invention to provide an improved shifting mechanism for marine drives.

SUMMARY OF THE INVENTION

A first feature of this invention is adapted to be embodied in a shifting mechanism for a dog clutch or the like having a shifting element movable from a disengaged position to an engaged position and retaining means movable between a released position and an engaged position for retaining said shifting element in its disengaged position. The retaining means is movable from its engaged position to its disengaged position in response to a predetermined movement of the shifting element from its disengaged position toward its engaged position. In accordance with this feature of the invention, accelerating means are provided for exerting a force on the shifting element in the direction of its movement from its disengaged position to its engaged position and before the retaining means has moved from its engaged position to its disengaged position.

Another feature of this invention is also adapted to be embodied in a shifting mechanism for a dog clutch or the like having a shifting element movable from a disengaged position to an engaged position and holding detent means comprising a first detent member and cooperating first cam surface for retaining the shifting element in its disengaged position. In accordance with this feature of the invention, accelerating detent means comprising a second detent member and a cooperating second cam surface are operative to effect a force on the shifting element in its direction of movement from its disengaged position to its engaged position.

Yet a further feature of this invention is adapted to be embodied in a detent mechanism for dog clutches or the like comprising a first member and a second member juxtaposed to each other and supported for relative movement. The first member has a detent recess adapted to be engaged by a detent and a first detent is carried by the second member and is biased to engage the recess for releasably restraining the members against relative movement. The first member further has a cam surface formed thereon that is spaced from the detent recess. A second detent is carried by the second member and is biased to engage the cam surface for applying a thrust to effect relative movement between the members.

BRIEF DESCRIPTION OF THE DRAWINGS

FIG. 1 is a cross-sectional view showing a prior art type of detent mechanism as used with dog clutches.

FIG. 2 is a cross-sectional view showing the transmission of a marine drive embodying a shifting mechanism constructed in accordance with a first embodiment of the invention.

FIG. 3 is an enlarged cross-sectional view taken along the line 3—3 of FIG. 2.

FIG. 4 is an enlarged cross-sectional view taken along the line 4—4 of FIG. 2.

FIG. 5 is an enlarged cross-sectional view taken along the line 5—5 of FIG. 2.

FIG. 6 is an enlarged view, in part similar to FIG. 1, showing the construction and operation of the embodiment of FIGS. 2 through 5.

FIG. 7 is a cross-sectional view through a detent mechanism constructed in accordance with another embodiment of the invention.

FIG. 8 is a cross-sectional view taken through a still further embodiment of the invention.

PRIOR ART

FIG. 1 shows the prior art type of detent construction commonly employed with forward/neutral/reverse transmission mechanisms embodying dog clutches for shifting driven gears into driving engagement with the output shaft. These detent mechanisms normally employ a first member 11 having a detent recess 12 into which a detent ball 13 is urged by a suitable spring mechanism (not shown). The detent ball 13 is supported for movement along an axis 14 by means of one of the members to be clutched together as is well known in this art. A pair of lands 15 are positioned on opposite sides of the detent recess 12 and terminate in inclined camming surfaces 16.

The detent ball 13 cooperates with the recess 12 so as to releasably hold the two members (11 and the non-illustrated member) in a neutral position. If it is desired to effect shifting into either forward or reverse, the member 11 is moved relative to the unillustrated member in one direction. The ball 13 will first be cammed out of the recess 12 so as to release the engagement between the two members. When the ball traverses the land 15 and after it comes into engagement with the cam surface 16, a thrust will then be exerted between the members so as to assist in engagement.

With the type of prior art construction as illustrated, the members must move relative to each other a distance equal to the distance L from the neutral position until a thrust is exerted upon the clutch jaws to bring them into engagement. Because a single detent ball cooperates with both the recess 12 and the camming surfaces 16, this geometric relationship is required. Hence, a rather substantial movement is required before any engaging thrust can be enjoyed and this unduly adds to the size and clearances between the components. Even if the width of the land 15 is reduced or completely eliminated, the members must move relative to each other a distance equal at least to the one-half of the width of the recess, which is in itself undesirable. The embodiments of the invention as will be described overcome these deficiencies without increasing the overall size of the detent and camming mechanisms.

DETAILED DESCRIPTION OF THE PREFERRED EMBODIMENTS

Embodiment Of FIGS. 2 Through 6

FIGS. 2 through 6 show an embodiment wherein the invention is employed in a marine drive transmission. Such a transmission is located within a lower unit 21 of a marine outboard drive. The lower unit 21 may comprise the lower unit of an outboard motor or, alternatively, the lower unit of the outboard drive of an inboard/outboard arrangement.

A drive shaft 22 extends through the lower unit 21 and is suitably journaled therein by means including a bearing 23. A driving bevel gear 24 is affixed to the lower end of the drive shaft 22 by means including a nut 25. The driving bevel gear 24 meshes with a pair of axially spaced driven bevel gears 26 and 27 of a forward/neutral/reverse transmission assembly, indicated generally by the reference numeral 28. The transmission assembly 28 is provided for selectively driving a propeller shaft 29, that is journaled in the lower unit 21 in a manner to be described, in either a forward or reverse direction. A propeller (not shown) is affixed to the outer end of the propeller shaft 29 as is well known in this art.

The driven gear 26 has a hub portion that is journaled in the lower unit 21 by means of an antifriction bearing 31. In a similar manner, the driven gear 27 has a hub portion that is rotatably journaled by a bearing 32 positioned in the lower unit 21. The propeller shaft 29 extends through and is journaled by the hub portions of the driven gears 26 and 27 in a suitable manner including bearings 33 that are interposed between the driven gear 26 and the inner end of the propeller shaft 29.

The transmission assembly 28 includes a dog clutch element, indicated generally by the reference numeral 34, that is positioned between the driven gears 26 and 27. In the prior art arrangement as shown in FIG. 1, the dog clutch element 34 is the same as the element identified by the reference numeral 11. In the prior art construction, the unillustrated element that supports the detent balls 13 would be the propeller shaft 29 although at times the members may be reversed or the detent and cam arrangement relocated.

The dog clutch element 34 is formed with internal splines 35 that mate with corresponding external splines 36 formed on the outer periphery of the propeller shaft 29 between the driven gears 26 and 27. The splines 35 and 36 establish a driving connection between the clutch element 34 and th propeller shaft 29 while at the same time permitting the clutch element 34 to move axially relative to the propeller shaft 29.

The clutch element 34 is formed with a first series of axially facing jaws 37 that face forwardly and which are adapted to coact with jaws 38 formed on the driven gear 26 so as to establish a driving relationship between the driven gear 26, the clutch element 34 and the propeller shaft 29. In a similar manner, the clutch element 34 is formed with rearwardly facing clutch jaws 39 that are adapted to cooperate with complementary clutch jaws 41 formed on the driven gear 27 so as to establish a driving relationship between the driven gear 27, the clutch element 34 and the propeller shaft 29.

The clutch element 34 is moved axially between a neutral and forward or reverse positions by means including an actuating plunger 42 that is slidably supported within a bore 43 formed in the inner end of the propeller shaft 29. The plunger 42 is axially affixed to the clutch element 34 by means of a pin 44 that extends transversely through the inner end of the plunger 42 and through a complementary bore formed at the base of a circumferential groove 45 in the clutch element 34. The pin 44 is retained within this bore by means of a coil spring 46 which is contained within the groove 45. The propeller shaft 29 is formed with an elongated slot 47 so as to accommodate axial movement of the pin 44 during the shifting movement, as will become apparent.

The plunger 42 is axially reciprocated by means of a follower member, indicated generally by the reference numeral 48, which is, in turn, slidably supported in a recess 49 formed at the forward end of the lower unit 21. The follower member 48 is formed with a cylindrical recess 51 in which a headed portion 52 of the plunger 42 is received. The headed portion 52 is adjacent a reduced diameter cylindrical portion 53 that extends through a recess in an upstanding wall of the follower member 48 so that the follower member 48 and plunger 42 will be locked together for simultaneous axial movement while, at the same time, permitting free rotation between the plunger 42 and the follower member 48.

A shift rod 54 extends vertically through the lower unit 21 for selectively operating the follower member 48, plunger 42 and transmission assembly 28. The shift rod 54 has an operator of a known type at its upper end so that it can be actuated by the operator of the associated watercraft.

The shift rod 54 has an enlarged, integral, cylindrical portion 55 positioned adjacent its lowermost end which is journaled in a complementary bore 56 formed in the lower unit 21. The shift rod 54 further has a smaller diameter cylindrical bearing portion 57 formed at its lowermost end that is journaled within a bore 58 formed in the lower unit 21 below the follower recess 49.

Between the cylindrical bearing portions 55 and 57, the shift rod 54 is provided with an integral drive portion, indicated generally by the reference numeral 59. The drive portion 59 is formed with a crank shaped, flattened part adjacent the bearing portion 57. This includes a drive pin 61 that is connected to the bearing portion 57 by means of an arm 62 and to the upper bearing poriton 55 by means of an arm 63. The follower member 48 has a pair of oppositely facing surfaces 64 between which the pin portion 61 is received so that rotation of the eccentric pin portion 61 about the axis defined by the bearing portions 55 and 57 will effect reciprocation of the follower member 48. The follower member 48 is formed with a clearance recess 65 below the surfaces 64 so as to clear the crank arm 62. In a like manner, the lower portion of the follower member 48 is formed with an elongated slot 66 so as to permit reciprocation of the follower member 48.

The structure as thus far described is generally typical of the prior art constructions. However, in accordance with this invention, an improved detent device is incorporated for releasably holding the dog clutch element 34 in its neutral position and for exerting a thrust upon the dog clutch element 34 for actuating it in either its forward or reverse direction axially relative to the propeller shaft 29. This detent mechanism is shown best in FIG. 4 and the theory of its operation may be best understood by reference to FIG. 6.

The detent mechanism includes a first holding detent assembly for releasably restraining the clutch element 34 in its neutral position. As has been previously noted, the plunger 42 is hollow and is, therefore, formed with an internal bore 67. This bore is intersected by a transversely extending bore 68 that is disposed at a relatively slight angle to the axis of the bore through which the pin 44 extends and which is slightly displaced from it. The reason for this will become apparent as this description proceeds.

Detent balls 69 are received within the bore 68 and are urged, in a manner to be described, into detent recesses 71 formed in the propeller shaft 29 at a postion corresponding to the neutral position of the plunger 42 and, therefore, the clutch element 34.

The biasing means comprises a larger ball 72 positioned in the plunger bore 67 and which is engaged by a coil compression spring 73 contained within this bore for urging the balls 69 into engagement with the recesses 71 when the clutch element 34 is in its neutral position.

In addition to the neutral holding detent mechanism, a second or accelerating detent mechanism is incorporated. In this embodiment, the accelerating detent mechanism is formed at an axially spaced location from the neutral holding detent mechanism. The accelerating detent mechanism includes a bore 74 that transversely intersects the bore 69 at the base of the latter. A pair of detent balls 75 are received within the ends of the bore 74 and are urged outwardly by a larger diameter ball 76 that is contained within the bore 67 and which is engaged by the other end of the spring 73. Hence, the ball 76 under the action of the spring 73 tends to urge the accelerating detent balls 75 radially outwardly.

The propeller shaft 29 is formed with a relatively narrow land 77 that has substantially the same diameter as the bore 73 and which is aligned with the plunger bore 74 when the plunger 42 and clutch element 34 are in their neutral position. Hence, the detent ball 75 will be driven inwardly into the bore 74 to displace the ball 76 and compress the spring 73.

On either side of the land 77, the propeller shaft 29 is formed with respective inclined accelerating cam surfaces 78 and 79 that are defined by recesses formed in the propeller shaft 29 at the base of its bore 43.

The operation of this embodiment will now be described. The Figures show the transmission 28 in its neutral position. In this position, the clutch element 34 and plunger 42 are restrained in a neutral position by the coaction of the holding detent balls 69 with the recesses 71 of the propeller shaft 29 (FIGS. 4 and 6). Hence, the driving gear 24 will rotate the driven gears 26 and 27 in opposite directons but the propeller shaft 29 will not be rotated. Hence, a neutral condition exists.

If it is desired to select forward drive, the shift rod 54 is rotated so that the drive pin 61 will exert a force to the left on the driven member 48 as viewed in FIG. 4. When the driven member 48 is urged to the left with sufficient force, the holding ball detents 69 will be cammed slightly inwardly against the action of the ball 72 and spring 73. Hence, the driven member 48 and plunger 42, as well as the clutch element 34, will begin to move to the left. This initial movement is resisted by the action of the spring 73 acting on the ball 72 to force the holding detent balls 69 outwardly.

During the initial movement toward the left, the accelerating detent balls 75 will move along the land 77. Once the distance equivalent to one-half of the width of the land 77 has been traversed (dimension A, FIG. 6,) the ball 75 will engage the accelerating ramp 79. It should be noted that this distance is less than the distance B (FIG. 6) that the holding balls 69 must traverse before they move out of the retaining recesses 71. Once the balls 75 engage the accelerating recesses 79, the spring 73 acting through the ball 76 will cause an accelerating force to be generated on the plunger 42, driven member 48 and clutch element 34 due to the inclination of the accelerating cam surfaces 79. Hence, the clutch jaws 37 will be snapped into engagement with the jaws 38 of the driven gear 26 so as to effect a quick and noiseless clutch engagement.

It should be apparent that, unlike the prior art, this acceleration force is achieved before the holding ball 69 is completely removed from its groove 71 so that a relatively compact arrangement employing a relatively small clearance between the clutch jaws 73, 38 and 39, 41 may be employed. Hence, a compact highly effective arrangement is provided.

When the holding detent balls 69 are cammed inwardly due to the clutch engagement, they will be retained in the bore 68 by the combined action of the ball 72 and their proximity to the pin 44. The angle of the bore 68 relative to the pin 44 is about forty-five degrees (45°) so as to establish an interference relationship that will preclude the detent balls 69 from completely leaving the bore 68.

When shifting to reverse, the accelerating balls 75 will engage the accelerating surfaces 78 so as to urge the plunger 42 and clutch element 34 in a direction to accelerate the engagement of the jaws 39, 41.

The point at which the acceleration begins can readily be varied by changing the width of the land 77 as is believed to be obvious to those skilled in the art.

Embodiment Of FIG. 7

The embodiment of FIGS. 2 through 6 provides axially spaced holding detents and accelerating detents. Under some circumstances, such arrangements have particular utility. In other instances, however, it may be desirable to provide a more compact arrangement. FIG. 7 illustrates such a compact arrangement wherein rather than being axially spaced from each other, the holding and accelerating detents are circumferentially or angularly spaced.

Referring now particularly to this embodiment, only the clutch element and detent mechanism have been illustrated and will be described in detail. Except as hereinafter noted, the other components of the transmission mechanism may be the same as with the embodiments of FIGS. 2 through 6. Alternatively, the invention, like that of the embodiment of FIGS. 2 through 6, may be used in other type of clutch mechanisms or in other transmission assemblies embodying dog clutches.

In this embodiment, a propeller shaft 101 has an outer splined surface 102 that is engaged by internal splines of a dog clutch element 103 so as to rotatably couple the dog clutch element 103 to the propeller shaft 101 while permitting axial movement of the clutch element 103 along the propeller shaft 101. The axial movement is accomplished in this embodiment by means of a shifting fork 104 that engages a circumferential groove 105 in the clutch element 103 so as to effect its axial movement.

The clutch element 103 has oppositely facing clutch jaws 106, 107, that are adapted to mesh with corresponding jaws of the driven gears (not shown).

The propeller shaft 101 is formed with a single transversely extending bore 108. Detent balls 109 and 111, which serve respective holding and accelerating functions, as will become apparent, are received in the opposite ends of the bore 108. A coil compression spring 112 is received between the balls 109 and 111 for urging them axially outwardly relative to the bore 108.

The holding detent ball 109 is urged, when the clutch element 103 is in a neutral position, into engagement with a holding recess 113 formed in the clutch element 103 adjacent the respective end of the bore 108. As with the previously described embodiment, the engagement between the ball 109 and recess 113 releasably holds the clutch element 103 in its neutral position.

Accelerating ball 111 engages a land 114 that is formed at the base of the opposite end of the bore 108 when the clutch element 103 is in its neutral position. Accelerating ramps 115 and 116 are formed on either side of the land 114. When the clutch element 103 has moved sufficiently so that the accelerating ball 111 engages either of the accelerating ramps 115 or 116, an axial thrust will be exerted on the clutch element 103 so as to snap the respective jaws into engagement with the cooperating driven member. With the previously described embodiment, this accelerating force is achieved before the holding ball 109 has moved completely out of the holding recess 113. The amount of movement required to achieve the accelerating force can be adjusted by appropriately selecting the length of the land 114 in relation to the width of the recess 113.

Embodiment Of FIG. 8

In the two embodiments of the invention described, the holding and accelerating detent devices function to hold and then accelerate relative axial movement between a pair of members. FIG. 8 illustrates an embodiment wherein the holding and accelerating means are operative in a rotary direction. As such, the detent mechanism of this embodiment may be used in conjunction with the shift rod 54 of an embodiment like that of FIGS. 2 through 6. That is, rather than having the detent mechanism operate on the clutch element per se, it may operate on the element which actuates the clutch element such as the shift rod 54.

Referring now to the embodiment of FIG. 8, a rotatably mounted member, such as a shift rod, is identified generally by the reference numeral 151. The rotatably mounted memeber 151 has a generally arcuate shaped holding recess 152 formed on one of its sides. A detent element 153, which forms a cantilevered arm of a leaf type spring 154, is engaged within the recess 152 when the shift rod 151 is in a position corresponding to its neutral position. The spring 154 is supported upon a suitable supporting member 155, which may constitute a portion fixed within the lower unit 21.

On the side diametrically opposite to the recess 152, the member 153 is formed with a cam like protuberance, indicated generally by the reference numeral 156. The protuberance 156 has a central land 157 of constant radius and inclined accelerating cam surfaces 158 and 159 of decreasing radius formed on opposite sides of the land 157.

An accelerating detent member 161, which may be a projecting end of a cantilevered leaf spring 162, normally engages the land 157 when the member 151 is in its neutral position. Like the spring 154, the spring 162 is supported at its other end on the member 155.

In this embodiment, when the member 151 is rotated in either direction from its neutral position, the detent element 161 will traverse the land 157 and engage either of the accelerating cams 158 or 159, depending upon the direction of rotation of the member 151. Once this engagement occurs, a rotary thrust will be exerted upon the member 151 so as to accelerate its rotation and snap the associated clutch elements into engagement. Again, the extent of the movement required for this to occur will depend upon the width of the land 157 and this acceleration is achieved before the detent member 153 completely leaves the recess 152.

SUMMARY

It should be readily that three embodiments of the invention have been disclosed, each of which provides a highly effectively arrangement for holding a member in a neutral condition and for accelerating that member toward another position before the holding means has been fully released. In each embodiment, this is achieved by means of two separate spring biased detent mechanisms, but it is believed to be readily apparent to those skilled in the art that other arrangements may also be provided for the same purpose. Also, although the invention has been described in conjunction with the transmission mechanism of a marine outboard drive, it may be used in other transmissions or in connection with other types of arrangements to the illustrated and described embodiments, various changes and modifications may be made without departing from the spirit and scope of the invention, as defined by the appended claims.

We claim:

1. A detent mechanism for dog clutches or the like comprising a first member and a second member juxtaposed to each other and supported for relative movement, said first member having a detent recess adapted to be engaged by a detent, a first detent carried by said second member and biased to engage said recess for releasably restraining said members against relative movement, said first member further having a cam surface formed thereon spaced from said detent recess, and a second detent carried by said second member and biased to engage said cam surface for applying a thrust to effect relative movement between said members, the means for biasing the first and second detents comprising a common spring.

2. A detent mechanism as set forth in claim 1 wherein the detents have identical configuration.

3. A detent mechanism as set forth in claim 2 wherein the detents are offset from each other.

4. In a shifting mechanism for a dog clutch or the like having a shifting element movable from a disengaged position to an engaged position and holding detent means comprising a first detent member and cooperating first cam surface for retaining said shifting element in said disengaged position, the improvement comprising accelerating detent means comprising a second detent member and a cooperating second cam surface for effecting a force upon said shifting element in its direction of movement from its disengaged position to its engaged position and a single spring acting on both of said detent members.

5. In a shifting mechanism as set forth in claim 4 wherein one of the detent members and cooperating cam surfaces comprise a ball and engaging surface.

6. In a shifting mechanism as set forth in claim 5 wherein both of the detent members comprise balls.

7. In a shifting mechanism as set forth in claim 6 wherein the detent balls are axially spaced from each other and the shifting element is axially movable.

8. In a shifting mechanism as set forth in claim 7 wherein the first and second detent members have different relationships with their respective cam members when the shifting element is in its disengaged position.

9. In a shifting mechanism as set forth in claim 8 wherein the first detent member is cooperative with the first cam surface when the shifting element is in its disengaged position and the second detent member is not in engagement with the second cam surface when the shifting element is in its disengaged position but engages the second cam surface before the shifting member moves to its engaged position and before the first detent member is fully disengaged from the first cam surface.

10. In a shifting mechanism as set forth in claim 6 wherein the balls are axially aligned with each other.

11. In a shifting mechanism as set forth in claim 10 wherein the balls are of the same diameter.

12. In a shifting mechanism as set forth in claim 10 wherein the first and second detent members have different relationships with their respective cam members when the shifting element is in its disengaged position.

13. In a shifting mechanism as set forth in claim 12 wherein the first detent member is cooperative with the first cam surface when the shifting element is in its disengaged position and the second detent member is not in engagement with the second cam surface when the shifting element is in its disengaged position but engages the second cam surface before the shifting member moves to its engaged position and before the first detent member is fully disengaged from the first cam surface.

14. In a shifting mechanism for a dog clutch or the like having a shifting element movable from a disengaged position to an engaged position and holding means movable between a released position and an engaged position for retaining said shifting element in its disengaged position, said holding means beng movable from its engaged position to its disengaged position in response to a predetermined movement of said shifting element from its disengaged position to its engaged position, the improvement comprising accelerating means for exerting a force upon said shifting means in the direction of its movement from its disengaged position to its engaged position and before said holding means has moved to its disengaged position and a single spring yieldably urging both said holding means toward its engaged position and said accelerating means in its force applying direction.

15. In a shifting mechanism as set forth in claim 14 wherein the holding means comprises detent means.

16. In a shifting mechanism as set forth in claim 15 wherein the accelerating means comprises detent means different from the detent means of the holding means.

17. In a shifting mechanism as set forth in claim 16 wherein each of the detent means comprises a respective detent ball.

18. In a shifting mechanism as set forth in claim 17 wherein the detent ball of the holding means is axially spaced from the detent ball of the accelerating means.

19. In a shifting mechanism as set forth in claim 18 wherein the accelerating means further includes an inclined cam surface with which the accelerating detent ball cooperates, the holding means further including a holding recess formed in the same member in which the accelerating cam means is formed and complementary in shape to the detent ball of the holding means.

20. In a shifting mechanism as set forth in claim 17 wherein the detent balls of the holding means and of the accelerating means are axially aligned but circumferentially spaced from each other.

21. In a shifting mechanism as set forth in claim 20 wherein the retaining means further includes a holding recess complementary in shape to the holding ball of the retaining means and wherein the accelerating means comprises an accelerating cam spaced from said recess and formed in the same member with which the ball of the holding means cooperates.

22. In a shifting mechanism as set forth in claim 2 wherein the balls of the accelerating means and the holding means have the same diameter and are both slidably supported in the same bore, the spring being interposed between said balls for urging said balls away from each other.

23. In a shifting mechanism as set forth in claim 1 wherein the accelerating means does not operate until the holding means has begun movement from its engaged position to its disengaged position.

24. In a shifting mechanism as set forth in claim 23 wherein the shifting element is movable in opposite directions from the disengaged position to respective opposite engaged positions, the accelerating means being effective to exert a force upon the shifting means in the direction toward either of its engaged positions.

25. In a shifting mechanism as set forth in claim 24 wherein the holding means comprises detent means.

26. In a shifting mechanism as set forth in claim 25 wherein the accelerating means comprises detent means different from the detent means of the holding means.

27. In a shifting mechanism as set forth in claim 26 wherein each of the detent means comprises a respective detent ball.

28. In a shifting mechanism as set forth in claim 27 wherein the detent ball of the holding means is axially spaced from the detent ball of the accelerating means.

29. In a shifting mechanism as set forth in claim 28 wherein the accelerating means further includes an inclined cam surface with which the accelerating detent ball cooperates, the holding means further including a holding recess formed in the same member in which the accelerating cam means if formed and complementary in shape to the detent ball of the holding means.

30. In a shifting mechanism as set forth in claim 27 wherein the detent balls of the holding means and of the accelerating means are axially aligned but circumferentially spaced from each other.

31. In a shifting mechanism as set forth in claim 30 wherein the holding means further includes a retaining recess complementary in shape to the holding ball of the holding means and wherein the accelerating means comprises an accelerating cam spaced from said recess and formed in the same member with which the ball of the holding means cooperates.

32. In a shifting mechanism as set forth in claim 31 wherein the balls of the accelerating means and the holding means have the same diameter and are both slidably supported in the same bore, the spring being interposed between said balls for urging said balls away from each other.

* * * * *

UNITED STATES PATENT AND TRADEMARK OFFICE
CERTIFICATE OF CORRECTION

PATENT NO. : 4,570,776
DATED : February 18, 1986
INVENTOR(S) : Takashi Iwashita

It is certified that error appears in the above-identified patent and that said Letters Patent is hereby corrected as shown below:

Column 5, line 12, "poriton" should be --portion--.

Column 5, line 45, "postion" should be --position--.

Column 6, line 18, "directons" should be --directions--.

Column 6, line 51, "73" should be --37--.

Column 8, line 14, "memeber" should be --member--.

Column 8, line 61, following "arrangements" insert
--wherein dog clutches or similar motion is employed. In addition--.

Column 10, line 48, Claim 22, "2" should be --21--.

Signed and Sealed this

Thirtieth Day of September 1986

[SEAL]

Attest:

DONALD J. QUIGG

Attesting Officer

Commissioner of Patents and Trademarks